United States Patent
Holsaple

(10) Patent No.: US 7,452,135 B1
(45) Date of Patent: Nov. 18, 2008

(54) FRICTION DAMPER FOR A BEARING

(75) Inventor: Kenneth W. Holsaple, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 315 days.

(21) Appl. No.: 11/489,347

(22) Filed: Jul. 18, 2006

(51) Int. Cl.
*F16C 23/06* (2006.01)

(52) U.S. Cl. .................. 384/535; 267/201; 267/202

(58) Field of Classification Search ............ 384/535, 384/581, 215, 218, 537, 585; 267/196, 201, 267/202, 203, 204
See application file for complete search history.

(56) References Cited

U.S. PATENT DOCUMENTS

| | | | | |
|---|---|---|---|---|
| 1,327,026 | A * | 1/1920 | Dabbs et al. ............. | 384/581 |
| 3,145,012 | A | 8/1964 | Kfoury | |
| 3,738,720 | A * | 6/1973 | Loehle .................... | 384/537 |
| 4,336,968 | A | 6/1982 | Hibner | |
| 4,353,604 | A | 10/1982 | Dulberger et al. | |
| 5,205,384 | A * | 4/1993 | Heshmat .................. | 384/581 |
| 5,800,070 | A | 9/1998 | Nilsson et al. | |
| 6,480,363 | B1 | 11/2002 | Prater | |
| 7,223,020 | B2 * | 5/2007 | Bauer et al. ............. | 384/535 |

* cited by examiner

*Primary Examiner*—Thomas R Hannon
(74) *Attorney, Agent, or Firm*—John Ryznic

(57) ABSTRACT

A support for a bearing that provides for damping of the bearing and for centering of the bearing within a housing, in which a plurality of cone shaped annular plates are stacked in series and positioned between the housing and an outer race of the bearing, the annular plates being offset from a plane normal to the rotational axis of the bearing such that vibration from the bearing produces rubbing of adjacent sides of the annular plates, the rubbing provides for friction damping of the bearing. The annular plates can be formed from a single wire strand formed in a coil, or from a plurality of annular cones stacked in series. The offset angle of the adjacent plates can be varied to affect the damping and the spring rate of the support. A coating for a sheet of another material can be placed between adjacent plates to change the frictional resistance due to rubbing between plates.

9 Claims, 2 Drawing Sheets

FRICTION DAMPER FOR A BEARING

BACKGROUND OF THE INVENTION

1. Field of the Invention

The present invention relates to supports, and more specifically to a support for a bearing.

2. Description of the Related Art Including Information Disclosed Under 37 CFR 1.97 and 1.98

A Prior Art bearing support is shown in FIG. 1. The bearing is supported by a member that provides both a spring (k) rate to support the bearing, and a damper for the bearing. The bearing support is secured to housing at one end, and an arm extends toward to bearing to provide support to the bearing outer race. The spring rate (k) can be varied by extending the length of the arm, or provide for a thicker arm.

A prior art friction damper is shown in FIG. 2, which is represented in U.S. Pat. No. 4,353,604 issued to Dulberger et al on Oct. 12, 1982 and entitled VISCOUS/FRICTION DAMPER shows a friction damper formed from a series of friction plates or discs (36 and 36A in the Figure of this patent) that surround a shaft, where the outer diameter of friction plates 36 is snugly fitted into the surface 30 and the inner diameter of alternate friction plates 36A is snugly fitted on the cylindrical surface 32. The plates are axially loaded against spring 44 projecting inwardly from the surface 30 by load spring 40. The contact surfaces of the friction plates are along a plane normal to the vibration direction. Pedestal 20 is supported in position by hairspring 24 which has one leg 26 grounded.

An object of the present invention is to provide for a bearing support that provides for damping of the bearing, provides for a spring rate to support the bearing, provide for a simple and easy damper to manufacture, and can withstand high temperatures.

BRIEF SUMMARY OF THE INVENTION

The present invention is a support having a friction damper formed of a wire having a rectangular cross section shape that is wrapped around a number of times in a circumferential direction such that the flat sides of the wire section make contact with the flat surfaces of the adjacent wire section. The flat wire sections are angled with respect to the direction of vibration in order that the vibration acting on the support is damped by the frictional rubbing of the flat sides that make contact. In the preferred embodiment, the frictional damper is used to support and dampen a roller bearing used in a gas turbine engine. Besides damping, the wire damper also acts to center the member it supports, provides a spring rate to the member that it supports.

DETAILED DESCRIPTION OF THE INVENTION

Figure 1:
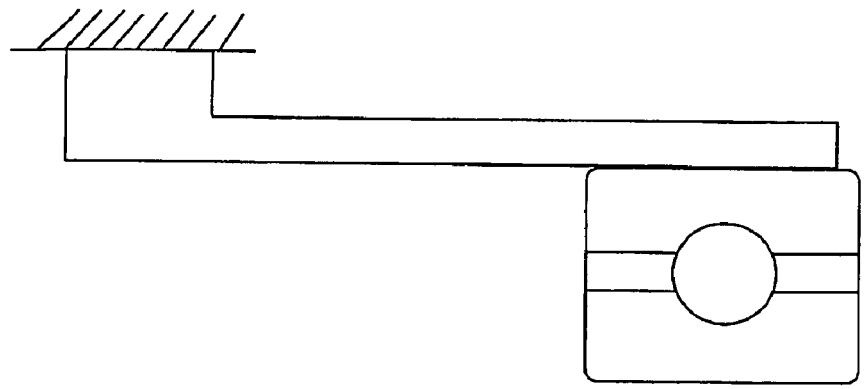
FIG. 1 shows a prior art bearing support.
Figure 2:
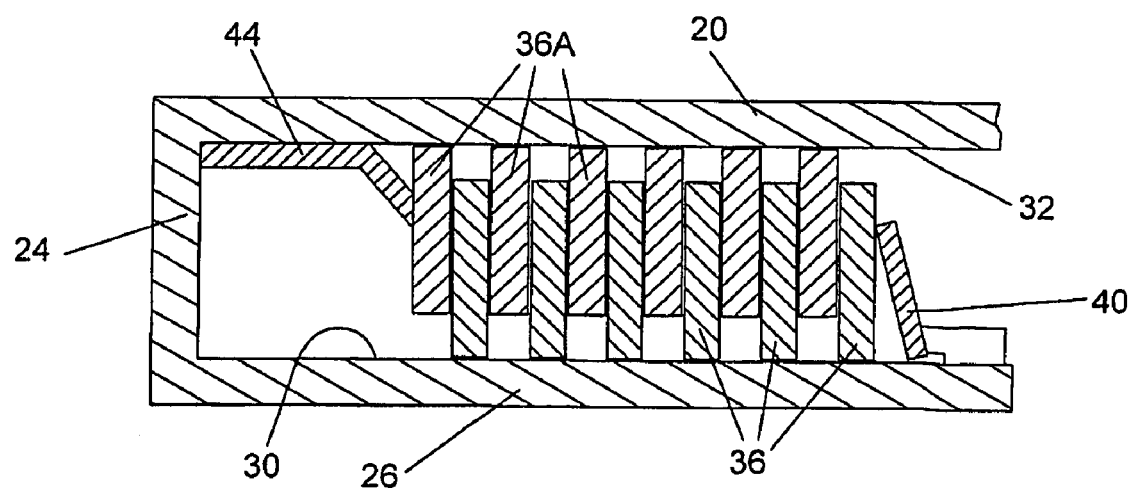
FIG. 2 shows a cross section view of a Prior Art friction damper.
Figure 3:
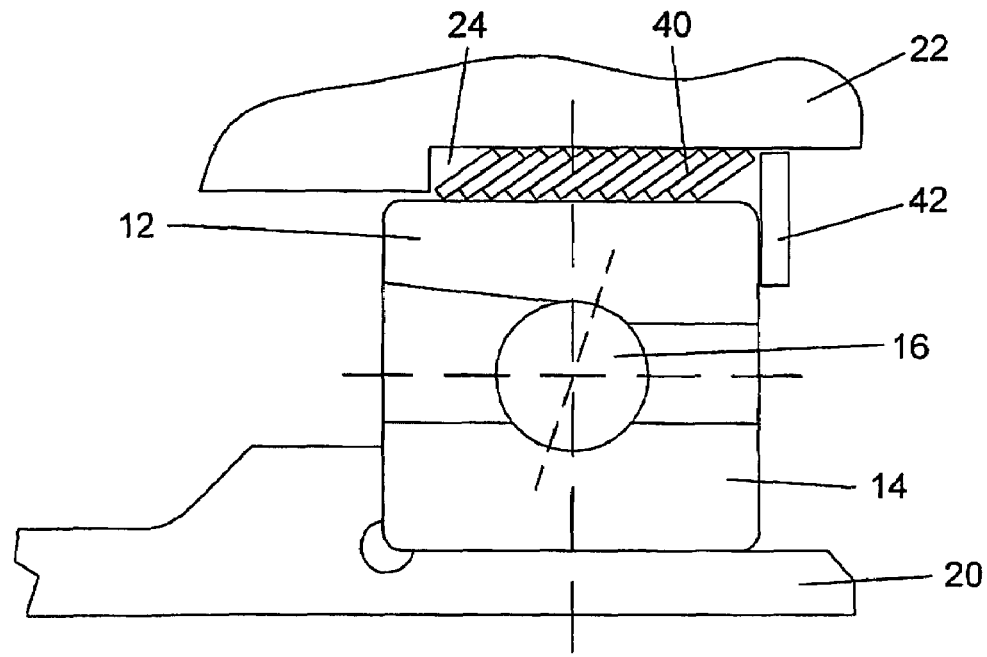
FIG. 3 shows a cross section view of the friction damper that supports a bearing of the present invention.

A ball bearing is shown in FIG. 3 and is supported by a friction damper of the present invention. The ball bearing includes an outer race 12 and an inner race 14 with a ball bearing 16 supported between the races. The inner race 14 is supported on a shaft member 20 while the outer race 12 is supported by a stationery housing 22. The stationary housing 22 includes an annular groove 24 formed therein in which the friction damper wire 40 is located. The damper 40 is formed from a wire material that has a rectangular cross section shape with flat side surfaces. The wire is wound in a circumferential arrangement so that adjacent flat sides of the wire make contact. Also, the wire is wound around the groove 24 such that the flat surfaces are angled with respect to the direction of vibration. As shown in FIG. 3, the flat sides of the wire damper are offset at about a 45 degree angle with respect to the vertical axis passing through the ball bearing. An offset of the wire damper is not limited to the 45 degrees shown in FIG. 3. An angle of the offset could be much less than 45 degrees or much greater than 45 degrees depending upon the characteristics the designer wants for the friction damper. The wound wire is of such size that the tips engage the surface of the groove 24 and the outer race 12 in order to retain the wire damper within the space formed between the groove and the outer race. An end piece 42 is secured to the housing 22 in such a way as to hold the outer race 12 in place and to prevent the wire damper from unwinding. The wire damper not only dampens the device it supports, but also centers the device.

Figure 4:
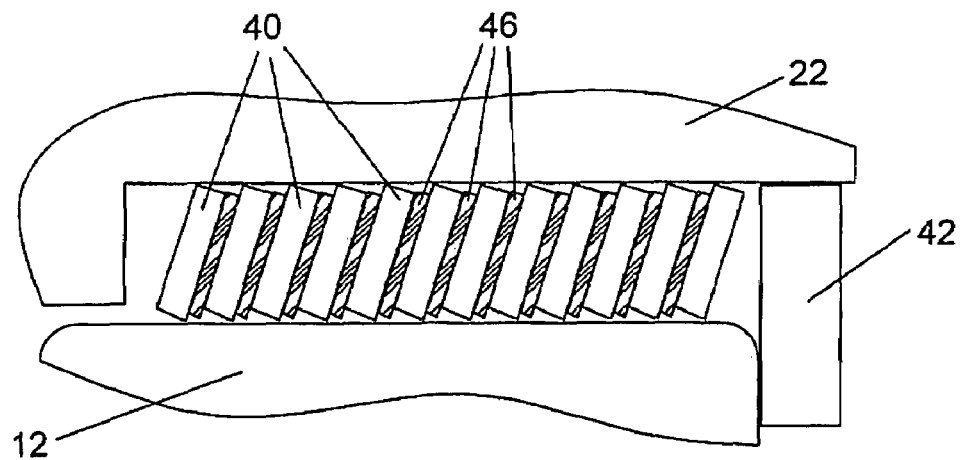
FIG. 4 shows a detailed view of a second embodiment of the friction dampers.

The wire damper 40 can also include a coating applied to a surface of the flat surfaces to control the frictional force between adjacent rubbing sides. The plates of the wire damper include a material on one side of the plate. The material can be a coating applied to the plate surface, or can be a second material placed between adjacent plates. The material can increase or decrease the friction between adjacent plates. The wire thickness, radial height and lay angle can be varied in order to change the stiffness and damping characteristics of the damper. Instead of a coating, a thin material can be positioned between adjacent wire sections as shown in FIG. 4. In this embodiment, the wire damper 40 is at an angle of about 45 degrees with respect to a plane normal to the rotational axis of the bearing. However, the angle could be from about 5 degrees to about 85 degrees. Thin frictional plates 46 made of any material that would produce the desired results are placed between adjacent plates 40 of the damper. The material acts to increase or decrease the friction between adjacent plates 40.

The wire damper is described as being formed from a wire strand that is would to form a coil in which adjacent sections of the wire can make contact to produce the friction damping described above. However, the damper can be formed of a plurality of annular sections that have the flat surfaces angled as shown in the figures. A plurality of cones can be stacked to form the damper in which the flat side plates make contact with adjacent annular cones to produce the friction damping and centering described above. An annular flat plate such as a washer can be formed into a cone shaped member by a press action, and a plurality of these can be stacked in series to form the damper.

In the above embodiments of the damper, the coiled wire or the stacked cone shaped plates form a plurality of cone shaped annular plates in which the flat surfaces of the plates that rub to produce the damping are offset from a plane normal to the rotational axis of the bearing. In the FIG. 3 embodiment, this offset is about 45 degrees from the plane normal to the rotational axis (the dashed line through the roller ball 16), while in the FIG. 4 embodiment the offset angle is about 30 degrees. When the cone shaped annular plates are offset, the edge that makes contact with the annular groove or the outer race surface is considered to be the tip. In the FIGS. 3 and 4 embodiments, the upper left corner would be the upper tip and the lower right corner would be the lower tip.

The wire damper of the present invention can be made of any material that would produce the damping effect described above. Some preferred materials would be steel or nickel alloys. One feature of the damper of the present invention is that it can be used in high temperature environments.

I claim the following:

1. A support for a bearing, the bearing having an outer race and a rotational axis, the support comprising:
    an annular groove formed within a housing;
    a plurality of cone shaped annular plates formed in series, each plate having an inner tip and an outer tip;
    the outer tips of the annular plates being in contact with the annular groove; and,
    the inner tips of the annular plates being in contact with the outer race; and,
    the annular plates being offset from a plane normal to the rotational axis of the bearing such that rubbing of adjacent plates provides damping for the bearing.

2. The support for a bearing of claim 1, and further comprising:
    the plurality of cone shaped annular plates formed in series is a single wire formed in a coil.

3. The support for a bearing of claim 1, and further comprising:
    the plurality of cone shaped annular plates formed in series comprise a plurality of annular cones stacked in series.

4. The support for a bearing of claim 1, and further comprising:
    the offset angle is from about 5 degrees to about 85 degrees from a plane normal to the rotational axis of the bearing.

5. The support for a bearing of claim 4, and further comprising:
    the offset angle is from about 40 degrees to about 50 degrees from a plane normal to the rotational axis of the bearing.

6. The support for a bearing of claim 1, and further comprising:
    an anti-friction material placed between adjacent plates to modify the frictional force between adjacent plates.

7. The support for a bearing of claim 6, and further comprising:
    the anti-frictional material is a coating applied to one of the contact surfaces of the plates.

8. The support for a bearing of claim 6, and further comprising:
    the anti-frictional material is a layer of material positioned between adjacent plates.

9. The support for a bearing of claim 1, and further comprising:
    an end piece to secure a wire damper within the annular groove.

* * * * *